(12) United States Patent
Twers

(10) Patent No.: US 8,991,846 B2
(45) Date of Patent: Mar. 31, 2015

(54) BICYCLE CHAIN GUIDE

(71) Applicant: Eric Raymond Twers, Vanier (CA)

(72) Inventor: Eric Raymond Twers, Vanier (CA)

( * ) Notice: Subject to any disclaimer, the term of this patent is extended or adjusted under 35 U.S.C. 154(b) by 0 days.

(21) Appl. No.: 13/952,697

(22) Filed: Jul. 29, 2013

(65) Prior Publication Data

US 2015/0028557 A1    Jan. 29, 2015

(51) Int. Cl.
*B62M 9/126* (2010.01)
*B62M 9/00* (2006.01)

(52) U.S. Cl.
CPC .......... *B62M 9/126* (2013.01); *B62M 2009/007* (2013.01)
USPC .......................................... 280/260; 280/283

(58) Field of Classification Search
CPC ....................................................... B62M 9/16
USPC ................. 280/284, 285, 259, 260, 261, 283; 474/112, 133
See application file for complete search history.

(56) References Cited

U.S. PATENT DOCUMENTS

| | | | | |
|---|---|---|---|---|
| 1,700,631 A | * | 1/1929 | Festini | 280/285 |
| 3,828,620 A | * | 8/1974 | Heathwaite et al. | 474/116 |
| 4,237,744 A | * | 12/1980 | Jolly | 474/116 |
| 4,789,042 A | * | 12/1988 | Pitts | 180/231 |
| 5,054,801 A | * | 10/1991 | Maguire | 280/261 |
| 5,618,240 A | * | 4/1997 | Gilbert | 474/50 |
| 6,474,669 B2 | * | 11/2002 | Colwell | 280/260 |
| 7,261,175 B1 | * | 8/2007 | Fahrner | 180/206.4 |
| 7,328,766 B2 | * | 2/2008 | Christini et al. | 180/224 |
| 7,722,072 B2 | * | 5/2010 | Hoogendoorn | 280/284 |
| 8,534,691 B2 | * | 9/2013 | Schaffer | 280/260 |
| 8,696,008 B2 | * | 4/2014 | Hoogendoorn | 280/284 |
| 2005/0263978 A1 | * | 12/2005 | Ascher | 280/261 |
| 2008/0020878 A1 | * | 1/2008 | Carl | 474/133 |
| 2009/0088284 A1 | * | 4/2009 | Patterson | 475/213 |
| 2009/0209379 A1 | * | 8/2009 | Nichols et al. | 474/112 |
| 2009/0258738 A1 | * | 10/2009 | Hara | 474/112 |
| 2009/0270210 A1 | * | 10/2009 | Firdaus et al. | 474/112 |
| 2010/0113200 A1 | * | 5/2010 | Yamamoto | 474/133 |
| 2010/0264622 A1 | * | 10/2010 | Bastianen | 280/281.1 |
| 2012/0204902 A1 | * | 8/2012 | Petersen | 134/6 |
| 2012/0322594 A1 | * | 12/2012 | Kitamura et al. | 474/110 |
| 2014/0225346 A1 | * | 8/2014 | Bettin | 280/236 |

* cited by examiner

*Primary Examiner* — Joseph Rocca
*Assistant Examiner* — Gabriela C Craciun

(57) ABSTRACT

The present invention reduces or eliminates suspension induced lower portion chain grow for rear derailer equipped bicycle drive trains using a pivoting mount for the common chain guide pulley. Attached about or near concentric with the chain ring and bottom bracket this mounting plate has a pivotally connected link to the suspension. The chain guide pulley is positioned to "take-up" or store some lower portion of chain length around the chain ring. Suspension activation creates pivotal movement of the guide mounting plate to relieve suspension induced chain grow by releasing some or the entire taken-up length of the lower portion of the drive chain.

1 Claim, 6 Drawing Sheets

BICYCLE CHAIN GUIDE

BACKGROUND OF THE INVENTION

To establish the context of the present invention we need to examine the state of the prior art as it relates to the drive train of the suspension equipped off-road bicycle.

Careful engineering has nearly eliminated chain grow (the lengthening of the distance of the run of drive chain from the chain ring or rings to the rear drive cog or cogs) from the upper, drive or tension portion of the drive chain due to the activation of bicycle rear wheel suspension. The recent trend is to use what is colloquially called a "1-by" drive train configuration, where a single front chain ring is used in combination with an increasingly large plurality of rear cogs forming an increasingly wide-ranging cassette. This is displacing previous 3-by-9 and 2-by-10 drive trains with a more and more common 1-by-10 and 1-by-11 configuration. This transition has been aided by the proliferation of the chain guide and what can be generically described as the clutch derailer. It is even more recently being enhanced by the emergence of an alternating wide-narrow tooth profile being used on the chain ring to allow a tighter fit between chain and chain ring. This allows the tension portion of the chain to be more directly guided onto and supported by the chain ring even when the chain line is offset due to shifting the chain across the plurality of rear cogs. This wide-narrow tooth profile can be used on a chain ring in a 1-by drive train since there is no longer a need to allow for ease of derailment. The clutch derailer serves to offer unidirectional resistance to cage movement to reduce vibration-induced motion of the lower portion of the drive chain (the return portion that is not under drive tension). This is commonly known as "chain slap". This additional resistance to slackening of the lower portion of the drive chain is often serving to reduce an inertial "whip effect". This is caused by halted downward inertia of the bicycle, such as when landing from a drop, causing the chain to continue downwards. With a traditionally sprung rear derailer, the inertia of the chain pulls the derailer cage forward which allows the inertia to progress forward in a wave or whip-like fashion to derail the chain from the bottom of the chain ring in the absence of a lower chain guide system. While the technology described above serves to address many problems, there remains an engineering challenge.

In many suspension designs there is a lengthening effect along the lower portion of the drive chain on suspension activation. This has previously been addressed by the inherent ability of the rear detailer to accommodate variations in effective chain length. Recent technological efforts and developments indicate that there is growing concern for the lower portion of the chain. The prior art suspension designs that do not address lower portion chain grow place additional requirements for what is called "derailer capacity"; this is the ability to handle a difference in effective chain length as a drive train shifts through the gears. It is common practice to verify correct and adequate chain length while a suspension linkage is moved through its entire range of motion. Failure to accommodate any suspension induced chain grow can have costly destructive effects. Even if the extra capacity requirement of the suspension design itself is addressed by proper chain length and sufficient derailer capacity, chain grow places an additional force on both clutch type and traditionally sprung rear derailers.

The effect of suspension induced chain grow on the derailer is greater than the inertial effect of the chain moving downwards because of the ratio of mass involved. The inertia of the lower portion of the chain comes from the mass of approximately half of the total length of chain; the chain grow effect is based on the downward inertia applied by the combined mass of the rider and bicycle.

We can also choose to examine a more subtle effect of chain grow in terms of static and kinetic friction. The clutch derailer produces a static friction against cage rotation to reduce chain slap, once activated by a strong mechanical force such as shifting the chain to a larger cog or suspension induced chain grow, the clutch is momentarily in a state of kinetic friction. Since the kinetic friction is less than static friction, once in rotation, the clutch has less resistance to motion. If activated by the suspension, a clutch derailer has less effectiveness against chain slap or inertial whip effect.

In light of the discussion above there exists a need to address suspension induced lower portion chain grow to let each aspect of the recently advancing prior art individually and only handle the functions it best performs.

BRIEF SUMMARY OF THE INVENTION

The present invention performs the task of reducing or eliminating suspension induced lower portion chain-grow using a pivoting mount for a common chain guide lower pulley. Attached about or near concentric with the chain ring and bottom bracket, this mounting plate has a pivotally connected link to the suspension. The chain guide pulley is positioned, while the suspension is un-weighted, to "take-up" or store some lower portion of chain length around the chain ring. Suspension activation creates linked pivotal movement of the guide mounting plate to relieve suspension induced chain grow by releasing some or all of the taken-up lower portion of drive chain.

While this invention provides a solution to the problem identified in the background text, it is important to limit its use to cases where the complete problem is present and not otherwise more simply handled. For the examples of the prior art suspension configurations that do not create any appreciable chain grow over the lower portion of the chain, this invention does not serve any required purpose. In cases where a plurality of cogs and derailer is not present, such as in motorcycle or internally geared bicycle drive trains, the use of a single, adequately sprung, pivotally connected lower chain guide pulley will not only suffice but have the additional benefits of compensating for chain wear.

DETAILED DESCRIPTION OF THE INVENTION

Figure 1:
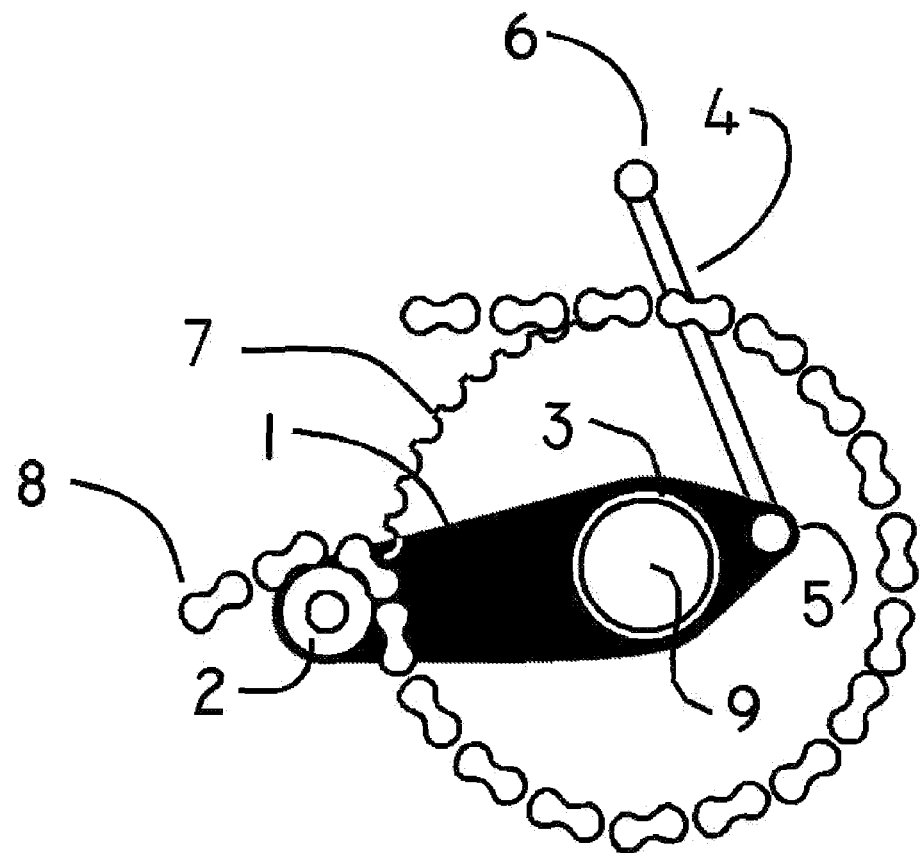
FIG. 1 is a representative sketch showing the components of the invention in their relative placement to the chain and chain ring.

Using FIG. 1 as a reference, the invention comprises a typical chain guide mounting plate (1) supporting a guide pulley (2). The guide mounting plate (1) is, as a novelty, both pivotally connected (3) at location concentric with the location of the bottom bracket (9) and at location (5) thus forming a bell crank which is pivotally connected by link (4) to a location on the suspension (not shown) at point (6). The limited detail of FIG. 1 is intended to isolate the components of the invention itself while indicating the relative position of the bottom bracket (9), chain (8) and chain ring (7).

Figure 2:
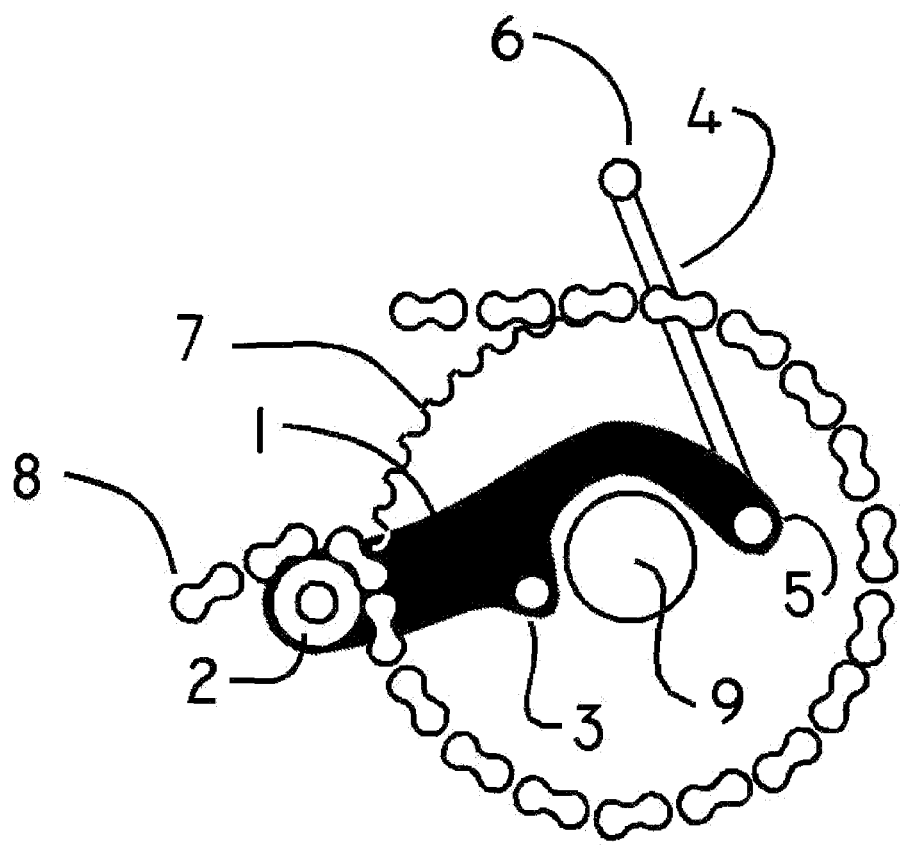
FIG. 2 demonstrates the invention of FIG. 1 with an alternate location for the pivotal connection.

We see an alternate pivotal connection point in FIG. 2 for guide mounting plate (1) at point (3). Point (3) now represents a location not far from the likely position of an ISCG (International Standard for Chain Guide) mounting tab. While as a retrofit option this may seem a favourable solution, in terms of real world implementation we must understand that there are, at the time of writing, two currently available ISCG standards present ("Old" and "05"), and any of: integrated flat through-hole tabs, integrated shell billet blind hole tabs, keyed or non-keyed adaptor plate options. While the continued presence of adaptor plate, keyed or otherwise, configurations may facilitate a retrofit for concentric mounting, it is the intent of FIG. 2 to demonstrate only one possibility and to leave the multitude of other possible configurations as understood to be obvious to one with ordinary skill in the art. An additional concern when exploring a near concentric mounting location is that the distance from the pulley (2) to the chain ring (7) will change to a degree relative to the distance between, and from linearity with the pulley (2), of mounting point (3) and the point of chain ring concentricity (9). Additional overlap of raised sides on the pulley (2) as it is later shown in FIG. 6 may be used to accommodate for this concern. The eccentrically mounted pivot of FIG. 3 may at the same time be used in cases where the rate of lower chain growth is not rotationally constant as in the cases of certain floating virtual pivot suspensions.

Figure 3:
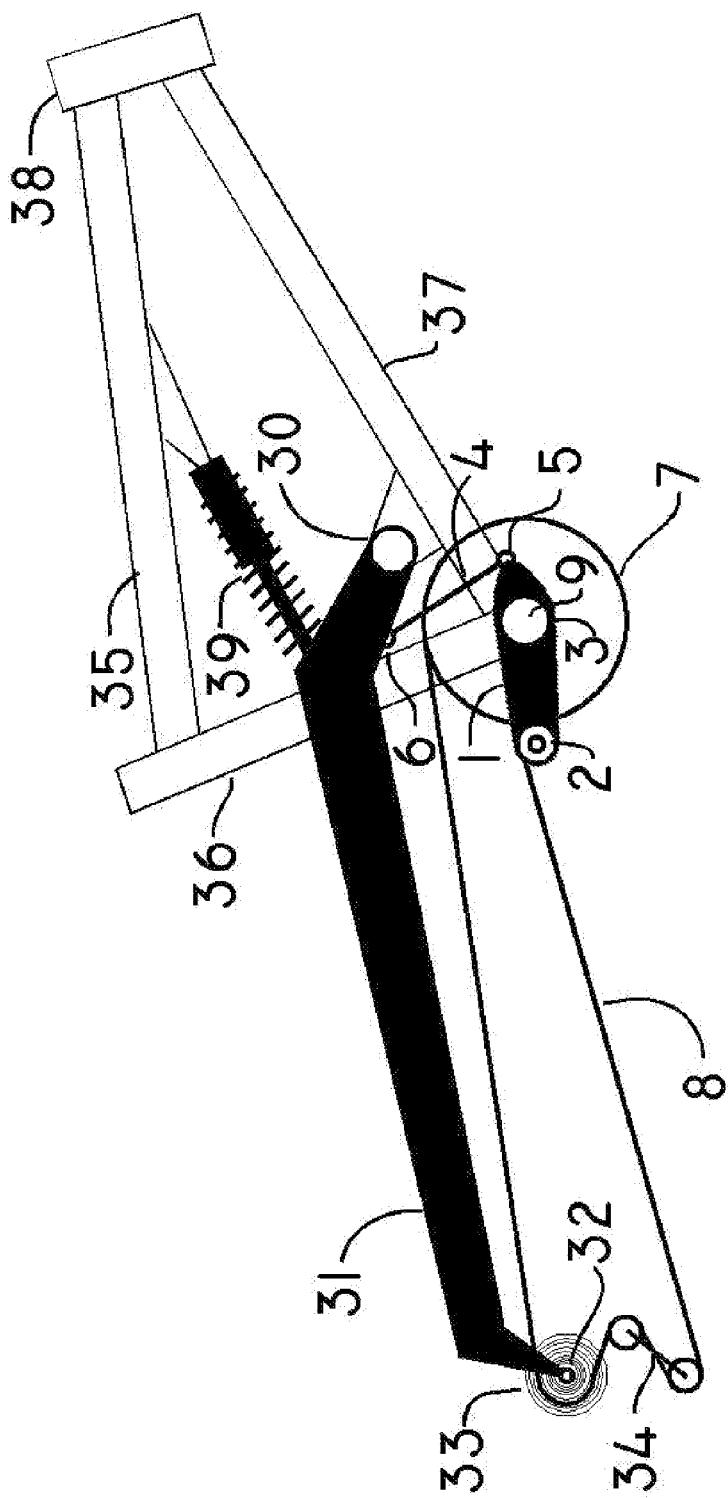
FIG. 3 shows the present invention within the context of a simple bicycle frame suspension showing additional drive train components.

We use FIG. 3 as a more complete context for the invention. The example of bicycle frame comprising: a front triangle with a traditional top tube (35), seat tube (36), down tube (37) head tube (38) and bottom bracket (9); a suspension swing arm (31) connected to suspension pivot (30), axle (32), concentrically connected plurality of cogs (33) and a shock absorber spring unit (39), is shown. We also introduce the representation of derailer cage and pulleys (34). From FIG. 1 the guide mounting plate (1), pulley (2), bottom bracket concentric pivotal mounting point (3), link (4), mounting location (5), chain ring (7) and chain (8) are all in evidence. We now demonstrate the connection of link (4) to the suspension (31) at point (6). While the effect and value of the invention may already be apparent the next two figures will be used to demonstrate this explicitly.

Figure 4:
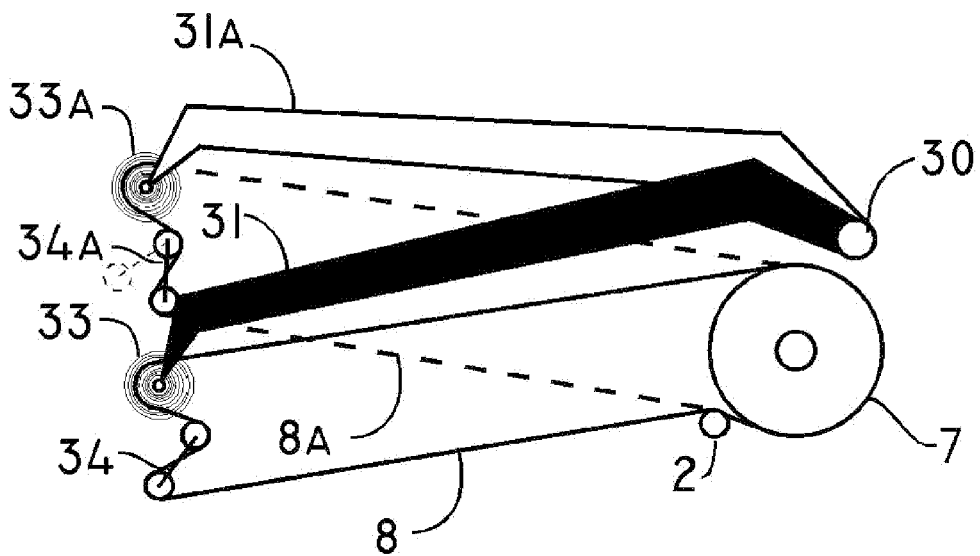
FIG. 4 illustrates an example of a drive train and suspension of the prior art demonstrating the issue as it needs to be addressed by this invention.

It is in FIG. 4 that we examine the issue of the prior art that is addressed by this invention. The pulley (2) is present but, as is the practice of the prior art, statically mounted. The proximity of pivot (30) to the chain ring (7) leaves little or no upper portion chain grow as the suspension member (31) activates to its compressed position (31a) bringing the plurality of cogs (33) to the position (33a). It is as we observe the effect of moving the chain (8) to position (8a) that we see the distance from the statically mounted pulley (2) to the position of the cogs (33a) change and thus require the positional change of the cage and pulleys of the derailer (34) to (34a). The ghost image is indicated with a dashed line to offer a perspective.

Figure 5:
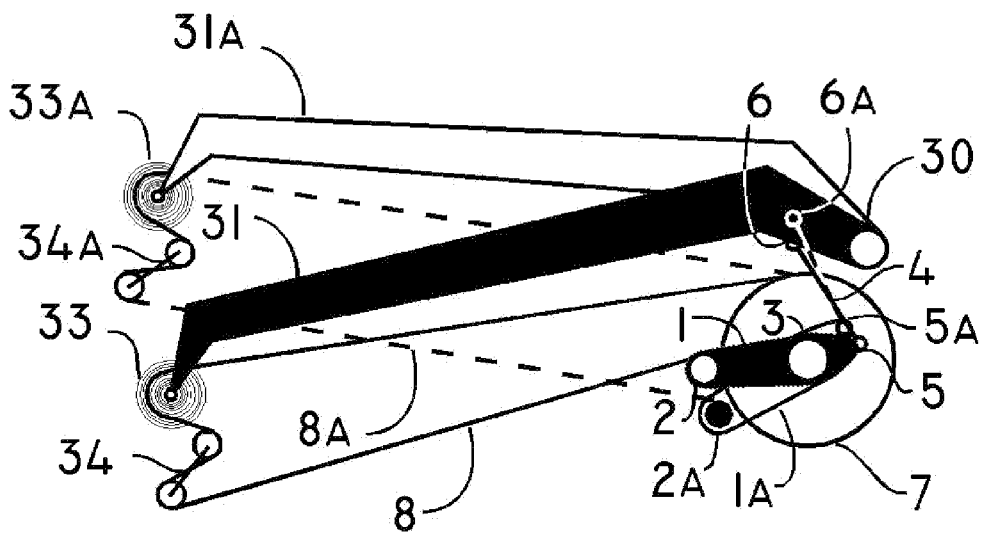
FIG. 5 presents this invention as it performs the desired task as implemented in the scenario presented in FIG. 4.

The representation of FIG. 5 demonstrates how this invention addresses the problem. When the suspension compresses and the swing arm (31) moves to position (31a) it: brings the cogs (33) to position (33a), moves mounting point (6) to position (6a) pulling on link (4) which moves point (5) to point (5a) causing the guide mounting plate (1) to rotate about pivot (3). Through the rotation of the guide mounting plate (1) to position (1a) the pulley (2) is repositioned to (2a). This change in pulley position relieves tension in the chain (8a) by releasing the portion of chain taken up around the chain ring (7) in the movement of the pulley (2) to its new position (2a). This allows the relative position of the derailer cage and cogs (34) to remain unaffected in position (34a). In the drawing it may first appear that the derailer has rotated from (34) to (34a) but we must account for its position relative to the swing arm (31a) that has itself undergone rotation from (31).

Figure 6:
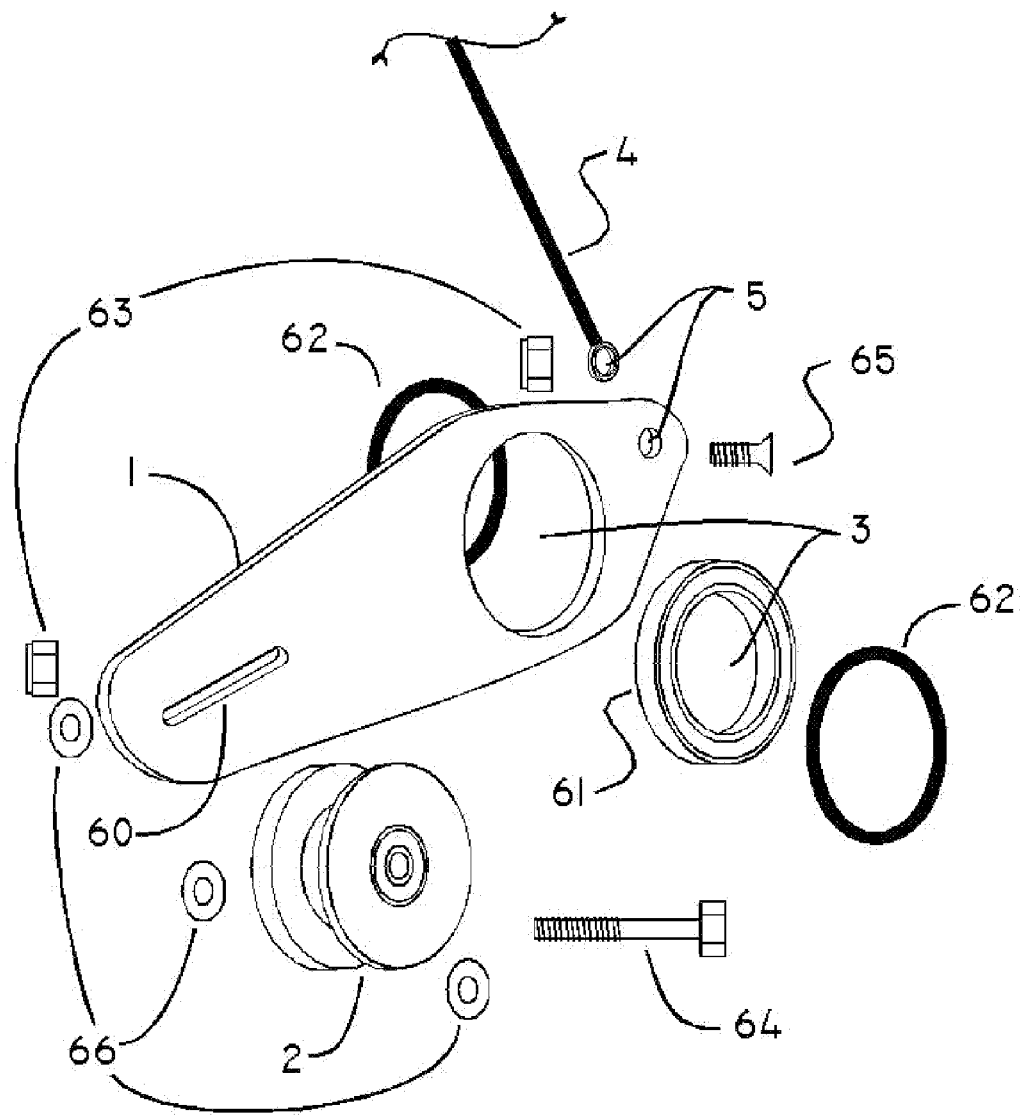
FIG. 6 provides a more detailed exploded view of the components of the invention.

The exploded view of FIG. 6 shows the components in more detail. The familiar guide mounting plate (1) is shown with the detail of a slotted mounting location (60) for the pulley (2) to allow for adaptation to different sized chain rings. Now depicted in more detail we see a rather ubiquitous chain guide pulley wheel (2) with optional offset to allow ease of lateral alignment and raised side flanges similar to that demonstrated in U.S. Pat. No. 5,725,450, the required mounting bolt (64), arrangement of washers (66) and one of the two nuts (61) shown. An increasingly more common miniature cog in a lateral side plate block as demonstrated in U.S. Pat. No. 8,235,849 or a slide plate can be used to replace this pulley. The pivotal connection (3) is shown as a combination of bearing (61) and required location in the guide mounting plate (1) as indicated by the double leader lines extending from (3). The possibility of using additional seals (62) to those already typical in bearing (61) is indicated by the representation of simple o-rings in the figure. It is possible to use more sophisticated sealing to protect the bearing (61) from contamination. Bearing (61) would need to be selected appropriately in each case but as a suggestion the common bearing code of 6708 may be considered a starting point. The double leader lines extending from (5) indicate the mounting location of the link (4) at point (5). The end of link (4) that connects to the guide mounting plate at point (5) is shown as a common rod-end but may also suitably be a standard bearing or bushing. The requisite mounting hardware is represented as a taper head bolt (65) and the other of the two nuts (63) shown. More appropriate fastening hardware, use of additional washers, optional threading or slotting of the guide plate at point (5) for effect configuration may all be considered on study of case-by-case implementation.

If the recent advances in the prior art are found unable to guide the chain onto the upper portion of the chain in all cases, a minimalist upper guide pulley, plate, tube or channel may be statically mounted to ensure that implementation of this invention does not reduce performance over a traditional chain guide.

Figure 7:
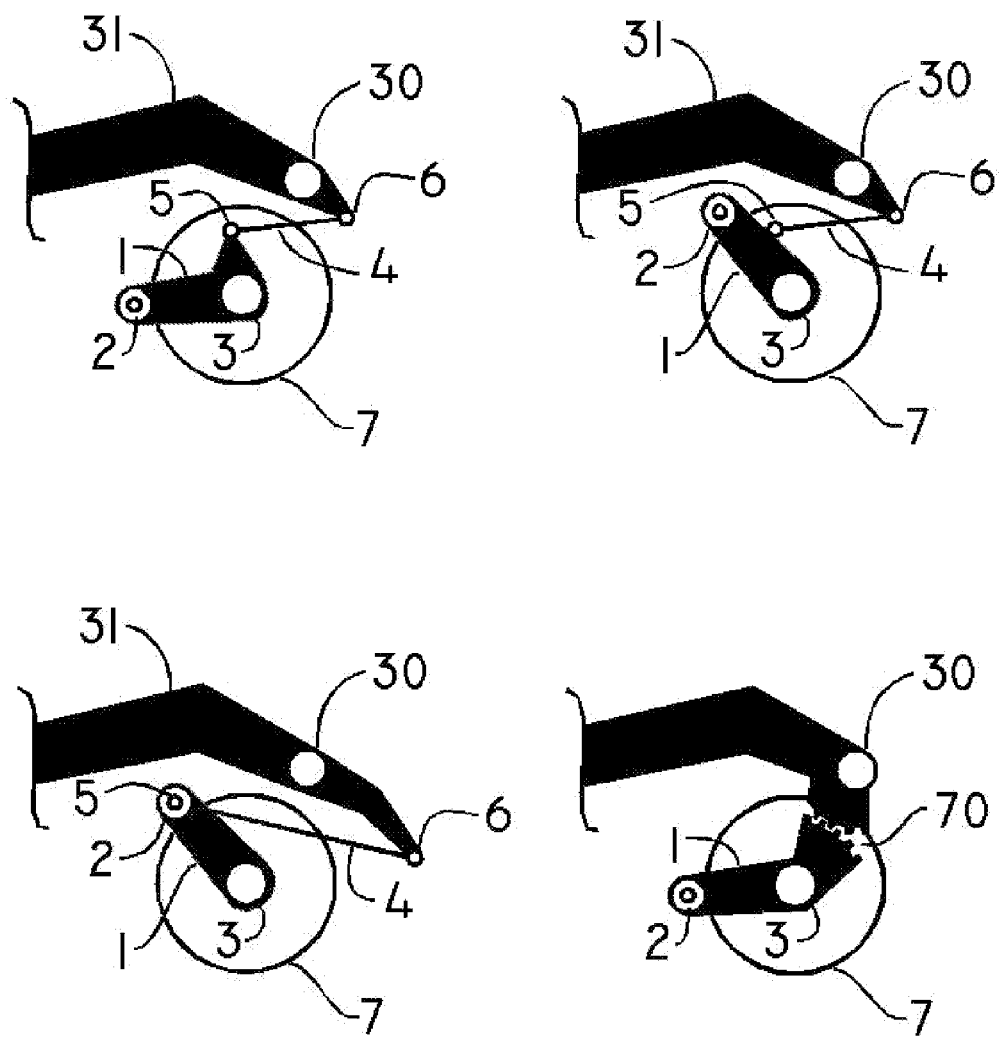
FIG. 7 serves to identify some alternate configurations of the linking of the invention to the suspension example used in FIGS. 3-5.

With FIG. 7 we demonstrate alternate implementations of the link (4) between the guide mounting plate (1) at point (5) and the suspension member (31) at point (6) which is now shown at an extension of the swing arm (31) past pivot (30). In each of the scenarios presented that use link (4), it now serves to activate the guide by pushing instead of pulling. From left to right, top to bottom, we see the following variations. Top left, link (4) pushing on a bell crank lobe at point (5). Top right, link (4) pushing on the guide mounting plate (1) at point (5) without a visible bell crank lobe. Bottom left, link (4) pushing the guide mounting plate (1) with point (5) mounted concentrically with the pulley (2), matching the leverage ratio by modifying the location of mounting point (6). This is also the first time we demonstrate leverage ratio as essential to configuration of the invention to match the chain grow of the suspension in question. These last two examples show the pulley (2) positioned higher up than the other examples. This can be beneficial to preserve the amount of chain engaged with the chain ring (7) when the upper portion of the chain is routed from above, around say an idler pulley concentric with the pivot (30). The final version in the bottom right shows the nearly banal implementation where the separate physical link (4) has been replaced by meshed gear teeth (70). With only a little imagination we could propose link (4) being replaced with belts or chain drives. While by no means complete or rigorous in its depiction of alternate implementations, this figure serves as a visual starting point for the statement of the next paragraph.

Given the detail of the preferred embodiment, the description and sketches contained within this document, variations, equivalents or alternate implementations will be apparent to those of ordinary skill in the art. It is therefore understood that the invention is not limited to the forms shown or described within. The scope of the invention is limited only by the appended claims.

What is claimed is:

1. A bicycle comprising:
   a rear suspension including a swing arm extending between a suspension pivot on a frame of the bicycle and a rear axle of the bicycle,
   a plurality of cogs concentric to the rear axle,
   a chain,
   a rear derailleur for changing gears and accommodating for variations in effective chain length,
   a driven front chain ring and
   a chain guide device attached to the bicycle, the chain guide device comprising:
      a pivotally connected mounting plate that is pivotally connected to a location concentric with the driven front chain ring, the mounting plate further including:
      a guide element selected from the group consisting of:
         a guide pulley;
         a pulley and guide block, and
         a slide plate;
      the chain guide device further comprising a pivotally connected link extending between the mounting plate of the chain guide device and the swing arm of the bicycle;
      wherein said pivotally connected link transmits a rotational motion to the mounting plate when the swing arm pivots relative to the bicycle frame such that tension of the chain is adjusted as the swing arm pivots.

* * * * *